United States Patent
Harberts et al.

(10) Patent No.: US 7,441,679 B1
(45) Date of Patent: Oct. 28, 2008

(54) ONE SIDED ADJUSTABLE CROSS RAIL

(75) Inventors: John H. Harberts, Macomb, MI (US); John Edward Klinkman, Riley Township, MI (US)

(73) Assignee: SportRack LLC, Sterling Heights, MI (US)

( * ) Notice: Subject to any disclaimer, the term of this patent is extended or adjusted under 35 U.S.C. 154(b) by 682 days.

(21) Appl. No.: 10/974,579

(22) Filed: Oct. 27, 2004

Related U.S. Application Data

(60) Provisional application No. 60/519,371, filed on Nov. 12, 2003.

(51) Int. Cl.
*B60R 9/00* (2006.01)

(52) U.S. Cl. ............... 224/321; 224/323; 224/315; 224/322; 224/325; 224/326; 224/331

(58) Field of Classification Search ........... 224/321, 224/323, 315, 322, 325, 326, 331
See application file for complete search history.

(56) References Cited

U.S. PATENT DOCUMENTS

| | | | | |
|---|---|---|---|---|
| 4,469,261 A | * | 9/1984 | Stapleton et al. | 224/321 |
| 5,314,104 A | * | 5/1994 | Lee | 224/321 |
| 5,397,042 A | * | 3/1995 | Pedrini | 224/329 |
| 5,588,572 A | * | 12/1996 | Cronce et al. | 224/321 |
| 5,715,980 A | * | 2/1998 | Blankenburg et al. | 224/321 |
| 5,730,343 A | * | 3/1998 | Settelmayer | 224/321 |
| 5,845,828 A | * | 12/1998 | Settelmayer | 224/321 |
| 5,924,614 A | * | 7/1999 | Kuntze et al. | 224/321 |
| 6,112,964 A | * | 9/2000 | Cucheran et al. | 224/321 |
| 6,779,696 B2 | * | 8/2004 | Aftanas et al. | 224/315 |
| 7,044,345 B2 | * | 5/2006 | Aftanas | 224/321 |
| 7,198,184 B2 | * | 4/2007 | Aftanas et al. | 224/309 |

\* cited by examiner

*Primary Examiner*—Nathan J Newhouse
*Assistant Examiner*—Lester L Vanterpool
(74) *Attorney, Agent, or Firm*—Rader, Fishman & Grauer, PLLC

(57) ABSTRACT

An article rack assembly is disclosed, including at least two siderails generally parallel to one another that are adapted to be secured to an outer body surface of a vehicle. At least one crossbar is generally perpendicular to the siderails having a length sufficient to span between the siderails. The crossbar has opposing ends that may each include a support assembly member. The support assembly member may include an actuating lever having a grip portion for facilitating engagement of the actuating lever and a locking portion. A rod member is disposed within the crossbar, and may be staked to each actuating lever such that pivoting of one the actuating levers from the locked to the unlocked position causes a generally simultaneous movement of a locking pin assembly at the opposite support assembly, thereby disengaging both locking pin assemblies from their respective siderails generally simultaneously.

16 Claims, 5 Drawing Sheets

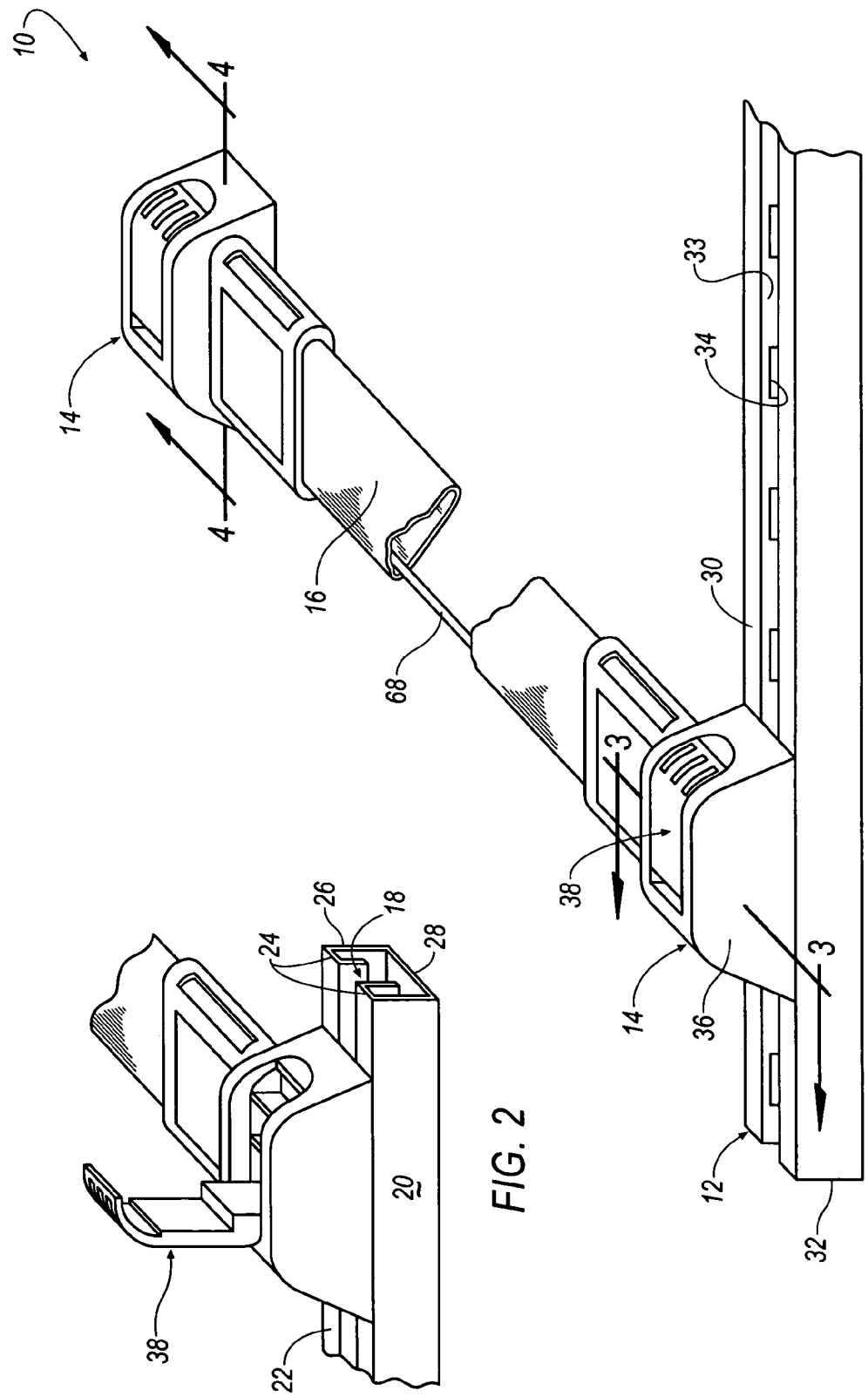

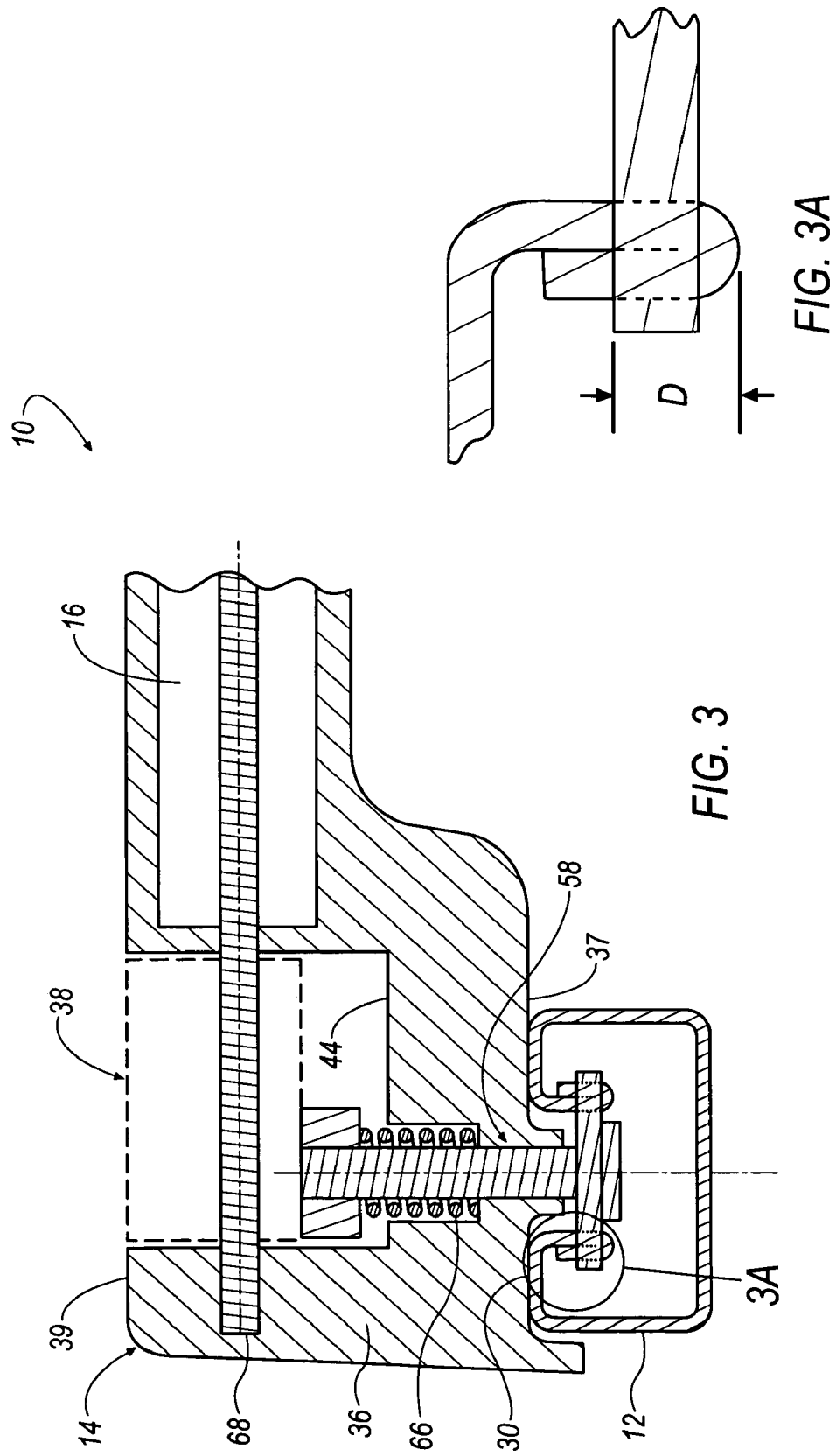

ONE SIDED ADJUSTABLE CROSS RAIL

CROSS-REFERENCE TO RELATED APPLICATIONS

This application claims the benefit of U.S. Provisional Application No. 60/519,371 filed on Nov. 12, 2003, the entire contents of which are herein incorporated by reference.

FIELD OF THE INVENTION

The present invention is directed to a luggage carrier or article rack assembly selectively mounted to an outer body surface of a vehicle, and having a single-sided release mechanism.

BACKGROUND OF THE INVENTION

Luggage carriers or article rack assemblies are used in a variety of applications to transport articles above an outer body surface of a vehicle. Such article carriers include a pair of slats or elevated siderails that are fixed to the outer body surface of a vehicle, a pair of bracket members disposed at the ends the slat or siderails, and at least one crossbar disposed between the bracket members as to be supported above the outer body surface by the bracket members. In many applications, two crossbars are employed with the second crossbar being secured either fixedly to the slats or siderails, or being adjustably secured via its own pair of bracket members disposed slidably upon the slats or siderails.

Each bracket member associated with a crossbar includes some form of locking mechanism with an actuating member for placing the locking mechanism in a locked or unlocked position. When the locking mechanism of each bracket member is in its unlocked position, the crossbar may be moved slidably along the slats or siderails to allow the crossbar to be repositioned to another location.

Unfortunately, this arrangement requires the user to unlock and lock each bracket member when repositioning the crossbar. First, one of the bracket members must be unlocked and then the user must walk around to the opposite side of the vehicle to unlock the other bracket member. Once the crossbar has been repositioned by the user, the user must place both of the bracket members in their locked position. This may pose an inconvenience to the user whenever the crossbar is repositioned.

Accordingly, an improved luggage carrier or article rack assembly allowing simultaneous locking and unlocking of both bracket members is desired. It would further be highly desirable to provide such a mechanism that will hold both bracket members in their locked and unlocked positions.

BRIEF SUMMARY OF THE INVENTION

The present invention provides a solution to a field problem by providing an article rack assembly having a single-sided release and locking mechanism in accordance with a provided embodiment of the invention. The invention includes a pair of siderails that are adapted to be fixedly secured to an outer body surface of a vehicle, the siderails including a channel disposed therein. The siderails are secured in a spaced apart and generally parallel configuration on the outer body surface of the vehicle. At least one crossbar is supported between the siderails. A bracket member or stanchion is disposed at each end of the crossbar slidably disposed to the siderails and fixed to the crossbar, which allows the crossbar to be repositioned along the siderails as required.

In one embodiment of the invention, the locking mechanism includes a lock plate, which is assembled into the stanchion, inserted into the siderail channel and selectively secured thereto. An actuating member is designed with a geometry that allows for the lock plate to be pushed out of physical contact with the siderail as the actuating member is moved in a first direction. A rod connects the driver side and passenger side actuating members through the crossbar. When one actuating member is actuated, both actuating members will move.

During operation, the user can move one of the actuating directions in the first direction, forcing both lock plates out of engagement with the siderail. The user is then able to slide the crossbar to a new desired position. When the user moves the actuating member in a second direction, the lock plates re-engage the siderail to secure the crossbar to the siderails.

BRIEF DESCRIPTION OF THE DRAWINGS

The features and inventive aspects of the present invention will become more apparent upon reading the following detailed description, claims, and drawings, of which the following is a brief description:

FIG. 1 is a perspective view of the present invention showing the stanchion, siderail, crossbar, detents in the crossbar, and the actuating member in a locked position.

FIG. 2 is a perspective view of the present invention showing the stanchion, siderail, and actuating member in an unlocked position.

FIG. 3 is a cross-section of the support assembly with a rod, spring, lock plate, and siderail showing the actuating member in the locked position.

FIG. 3A is a detailed view of the siderail and lockplate as shown in FIG. 3 in the locked position.

DETAILED DESCRIPTION OF THE INVENTION

Figure 4:
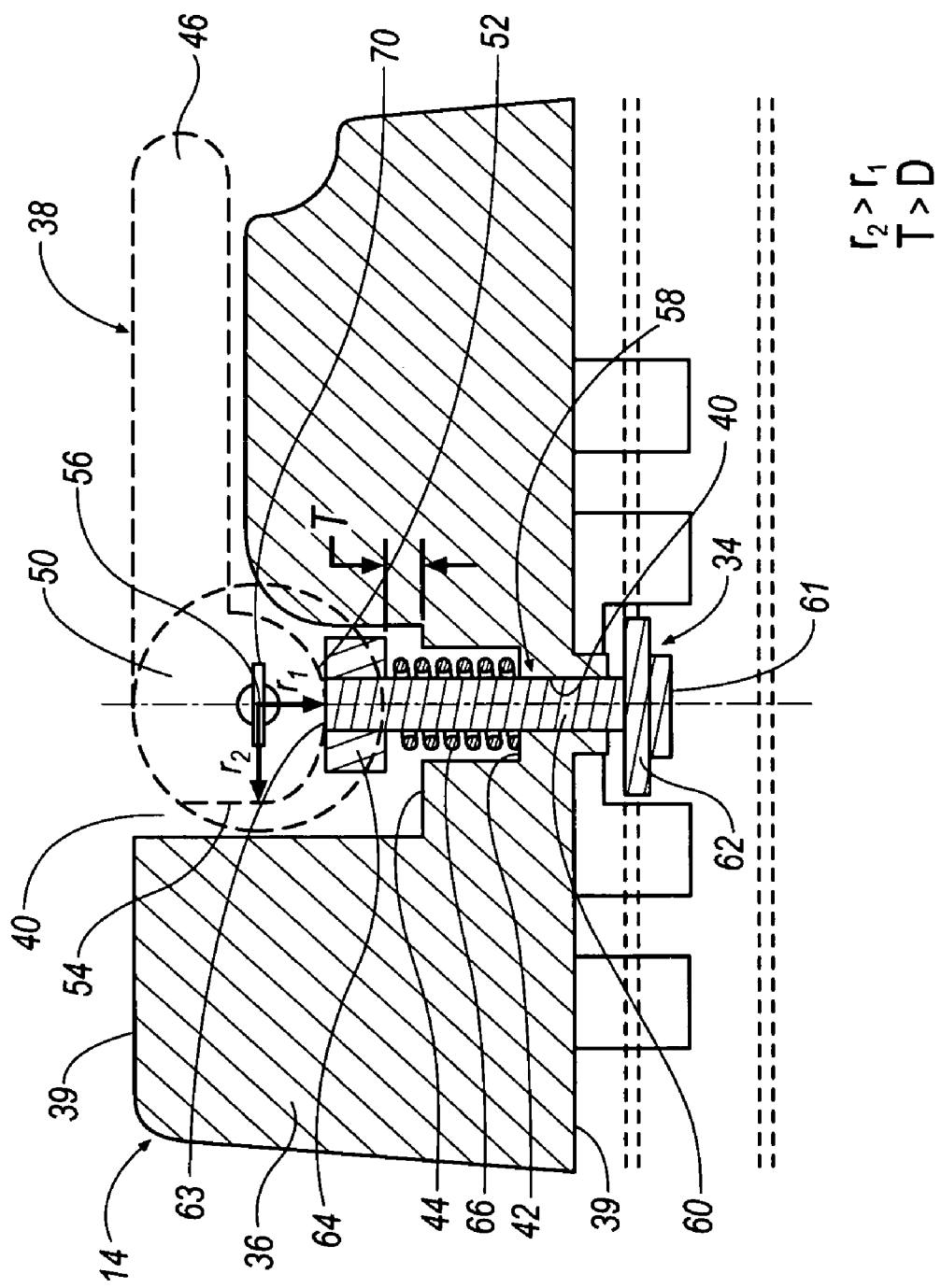
FIG. 4 is a cross-section of the support assembly with a rod and lock plate showing the actuating member in the locked position.

Referring now to the drawings, the preferred illustrative embodiments of the present invention are shown in detail. Although the drawings represent some preferred embodiments of the present invention, the drawings are not necessarily to scale and certain features may be exaggerated to better illustrate and explain the present invention. Further, the embodiments set forth herein are not intended to be exhaustive or otherwise limit or restrict the invention to the precise forms and configurations shown in the drawings and disclosed in the following detailed description.

The luggage carrier 10 generally comprises a pair of spaced generally parallel longitudinally extending siderails 12 that are adapted to be securely fixed to an outer body surface of a vehicle (not shown), and at least one support assembly 14 as shown in FIG. 1. The support assembly 14 is movably mounted to the siderails 12 and includes a crossbar 16 extending along a lateral axis generally perpendicular to the siderails 12 and support assembly members 14 disposed at opposite outer ends of the crossbar 16 and in selective contact with a corresponding siderail 12. Members 14 are typically secured to cross bar 16 by way of a sleeve member disposed at each opposing end of the cross bar. Each of the support assembly members 14 are adapted to move along its corresponding siderail 12 to allow the crossbar 16 to be repositioned along the siderail 12 as may be needed.

In one embodiment of the invention as shown in FIG. 2, each siderail 12 defines an elongated interior channel slot 18 formed through an outer wall 20 of the siderail 12. In the illustrated embodiment, the chosen outer wall is the top wall 22 of the siderail 12 such that upper edges of opposing side walls include inwardly extending legs 24 that terminate to define the channel slot 18. The first side wall is an inboard wall 26 and the second side wall is an outboard wall 20. A bottom wall 28 is disposed between the opposing side walls. The bottom wall 28 is shaped to generally correspond to and is adapted to be secured to the outer body surface (not shown).

The channel slot 18 extends substantially the length of the siderail 12 and provides an opening between the interior channel slot 18 and exterior surface 30 of the siderail 12. The siderails 12 preferably have a modular construction and include one or more end caps (not shown) secured to one or both ends 32 of the elongated siderail housing 12.

In one preferred embodiment of the invention, at least one and more preferably both of the interior channel slot side walls 33 include a plurality of spaced apart detents 34 located on the inside portion of the siderail 12 spanning a substantial length of the siderail 12. When both side walls 33 include the detents 34, the corresponding detents 34 of each side wall 20 are generally equally spaced from a longitudinal end of the siderail 12 so that a detent 34 of the inboard side wall 26 is in facing relation to a detent 34 of the outboard side wall 20 (i.e., the detents 34 are generally directly across from each other). Similarly, the siderails 12 are aligned such that mating detents 34 are in substantial alignment as the support assembly 14 is moved along the siderails 12.

Each support assembly 14 is preferably formed from light weight steel or metal or from molded plastic so as to be easily slidable with respect to the siderail 12 structures. Similarly, the siderail 12 is also formed from one of the same materials as the support assembly. The crossbar 16 includes a hollow portion extending laterally from end-to-end. In some aspects of the invention, the entire interior of the cross bar 16 is hollow while in other aspects the cross bar may be generally solid with a thru hole.

When the article carrier assembly 10 is in its assembled orientation, each siderail 12 has at least one support assembly member 14 adjustably mounted to an outer surface 30 of the siderail 12. Each support assembly member 14 includes an integral stanchion 36 and a separate actuating member 38 such as a lever or wheel as shown in FIG. 4. A lever is illustrated. The stanchion 36 includes a first surface 37 intended to contact the outer surface 30 of the siderail 12 and a second outer surface 39 intended to receive the actuating lever 38. A counter bore 40 is disposed between the first outer surface 37 of the stanchion 36 and the second outer surface 39 of the stanchion 36. In the illustrated embodiment, the counter bore 40 is a two-step counter bore with a first step 42 adjacent the first outer 37 surface and a second step 44 adjacent the second outer surface 39.

The actuating lever 38 comprises an outer manually graspable, rotating grip portion 46 defining a first end and a locking portion 50 defining a second end. In a preferred embodiment, the locking portion 50 of the actuating lever 38 includes a first arcuate surface 52 in the form of a cam and a second generally flat surface 54 adjacent arcuate surface 52. The locking portion 50 also includes an offset pivot point 56 in the form of an opening extending through the locking portion 50. The actuating lever 38 is received in the opening defined between the second outer surface 39 and second step 44 of the counter bore 40 of the stanchion 36, the locking portion 50 entirely within the opening and the gripping portion 46 extending outwardly of the opening and selectively away from the second surface 39 of the stanchion 36 as explained in greater detail below.

A locking pin assembly 58 is adapted to interact with both the actuating lever 38 and the siderail 12. In a preferred embodiment of the invention the lock pin assembly 58 includes a lock pin 60 having two opposing ends. Adjacent a first end 61 of the lock pin 60 is a lock plate 62 generally perpendicular to the axis of the lock pin 60. The first end 61 of the lock pin 60 is intended to be received within the interior channel slot 18 of the siderail 12 with the lock plate 62 selectively contacting an interior surface of the siderail defined by the interior channel slot 18. In the illustrated embodiment, the lock plate 62 selectively engages an interior surface of the legs 24 of the side walls disposed on either side of the slot 18. The second end 63 of the lock pin 60 extends outwardly away from the interior channel slot 30 and is received within the counter bore 40 of the stanchion 36. It extends beyond the opening defined between the first step 42 and the second step 44 of the counter bore 40 into the opening defined between the second step 44 and the second outer surface to engage the locking portion 50 of the actuating lever 38.

Preferably, the locking pin assembly 58 includes a spring retention mechanism 64 adjacent the second end 63 of the pin 60 with a spring 66 disposed between the spring retention mechanism 64 and the first step 42 of the counter bore 40. While a spring 66 is shown, other biasing members such as a mechanical element and an elastic element may be used. The spring 66 is biased to move the pin 60 further into the stanchion 36. The spring retention mechanism 64 optionally serves a second function and that is to prevent separation of the locking pin assembly 58 from the stanchion 36, by selectively contacting the second step 44 of the counter bore 40. Thus, the support assembly 14 cannot be separated from the siderails 12 except at the ends 32 of the siderail 12 where the interior channel slots 18 terminate.

The two actuating levers 38 of the support assembly 14 are secured to their respective support assemblies 14 by means of a rod 68 disposed between the stanchions 36 and running through the hollow portion of the crossbar 16. The opposite ends of the rod 68 extend through the corresponding pivot points 56 of each locking portion 50. The rod 68 may be solid or hollow so long as the circumferential extent of rotational motion at one end of the rod 68 is essentially duplicated at the opposite end of the rod 68. For purpose of this application, a rod 68 having such a feature shall be considered a rigid rod. The actuating levers 38 are staked to the rods 68 such as by way of a separate stake 70 such that rotational motion of either lever 38 by way of moving the gripping portion 46 about the pivot point 56 is translated to the lever 38 at the opposite end of the rod 68.

In a locked orientation, the locking pin 60 of each support assembly 14 is biased to be received within a detent 34 of the siderail 12. The second end 63 of the locking pin 60 is in contact with the arcuate surface 52 of the locking portion 50 of the actuating lever 38. The axial distance "D" as shown in FIG. 3A to release the locking pin 60 from a detent 34 is slightly less than a corresponding axial distance "T" as shown in FIG. 4 defined between the spring retention mechanism 64 and the second step 44.

Figure 5:
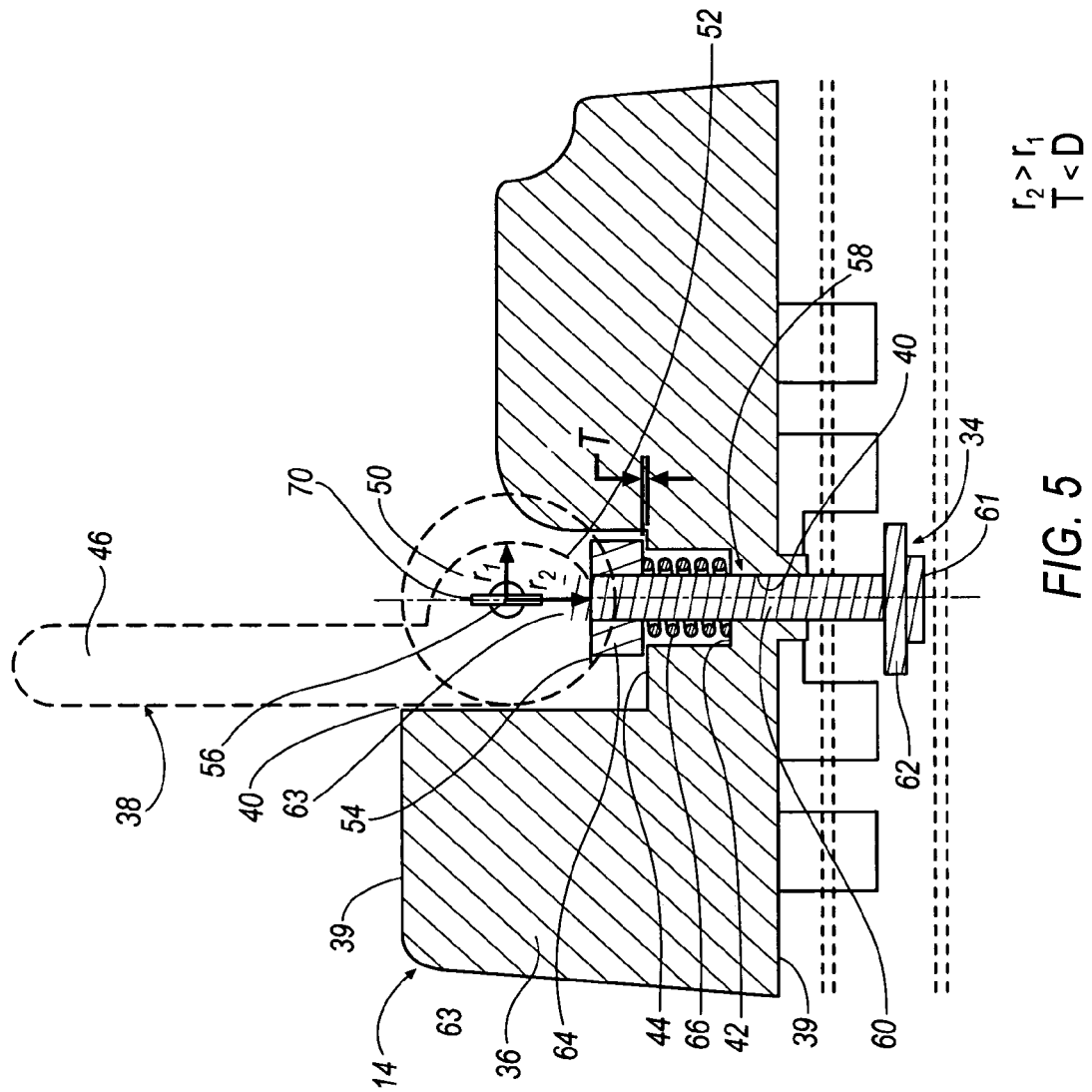
FIG. 5 is a cross-section of the support assembly with a rod and lock plate showing the actuating member in the unlocked position.
Figure 6:
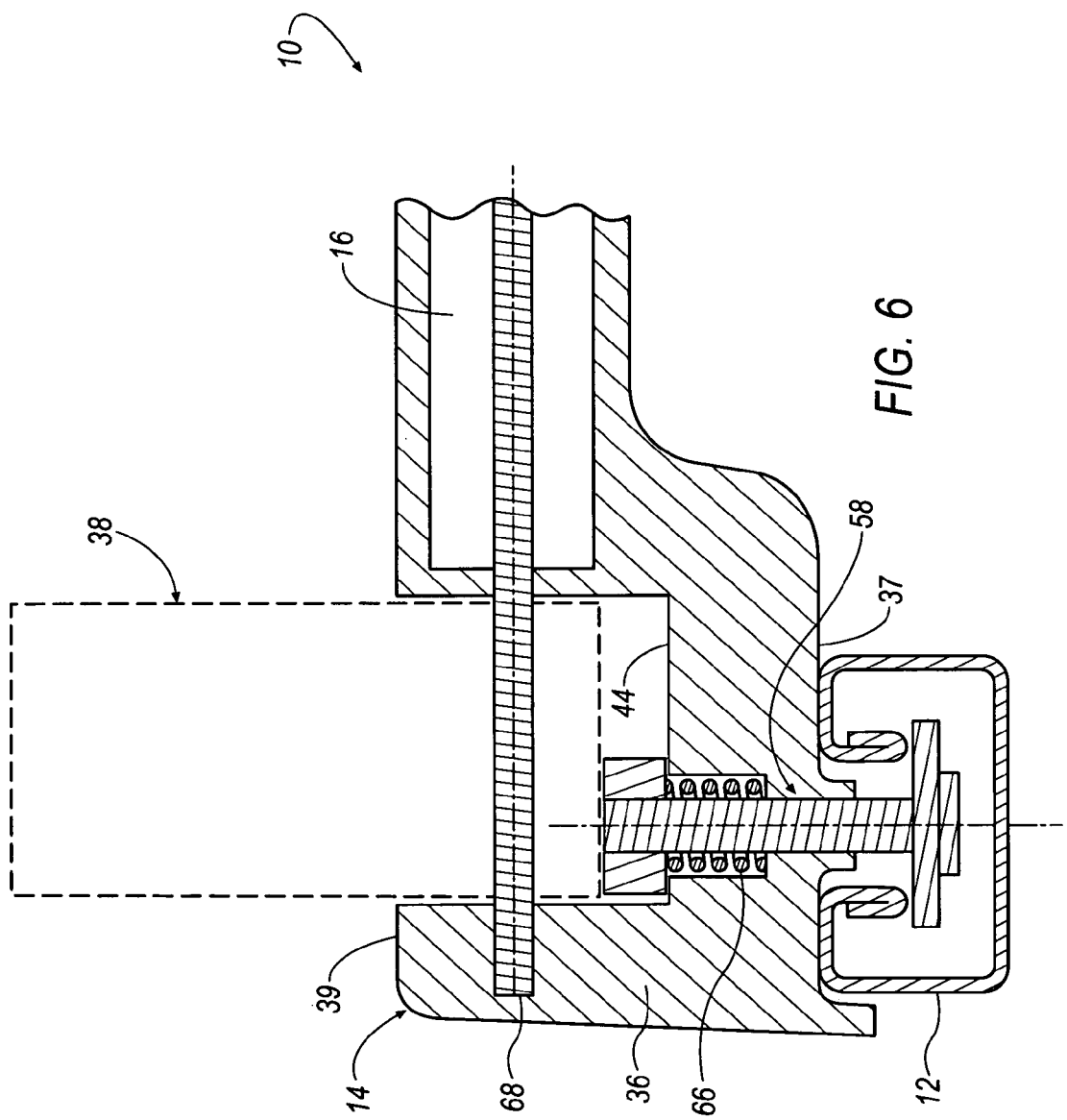
FIG. 6 is a traverse section of FIG. 5 showing the actuating member in the unlocked position.

To unlock the support assembly 14 to permit it to be moved along the siderail 12 to the next detent 34 as shown in FIGS. 5 and 6, one of the actuating levers 38 is manually pivoted by a user. The lever 38 at the other end of the rod 68 will also automatically be pivoted since the rods 68 are staked to the levers 38 as discussed above. The locking portion 50 of the actuating lever 38 is sized such that as the lever 38 is pivoted, the camming feature of the locking portion 50 forces the pin 60 out of the counterbore 40 of the stanchion 36 slightly more than the distance "D" while being less than distance "T". Thus, if the arcuate surface 52 has a distance r1 from the pivot point 56 when locked and a distance r2 when unlocked the difference between the distances r2-r1 is greater than distance "D". The total distance r2 is reached when the second end 63 of the pin 60 engages the flat surface 54 of the locking portion 50 to maintain the lever 38 in an unlocked position. The support assembly 14 can then be moved. Once the assembly 14 is aligned with corresponding detents 34 for each siderail 12, the actuating lever 38 can be rotated back to the locked orientation. The pin 60 retracts back into the counterbore 40 of the stanchion 36 using the biasing feature of the spring 66 and into locking engagement with the corresponding siderail 12.

The detents 34 are optional. However, they help to avoid undesirable movement of the support assembly 14 along the siderails 12 when the support assembly 14 is in the locked position by providing a physical lock between the pin assembly 58 along the longitudinal axis if the biasing force of the spring 66 is overcome.

The present invention has been particularly shown and described with reference to the foregoing embodiments, which are merely illustrative of the best modes for carrying out the invention. It should be understood by those skilled in the art that various alternatives to the embodiments of the invention described herein may be employed in practicing the invention without departing from the spirit and scope of the invention as defined in the following claims. It is intended that the following claims define the scope of the invention and that the method and apparatus within the scope of these claims and their equivalents be covered thereby. This description of the invention should be understood to include all novel and non-obvious combinations of elements described herein, and claims may be presented in this or a later application to any novel and non-obvious combination of these elements. Moreover, the foregoing embodiments are illustrative, and no single feature or element is essential to all possible combinations that may be claimed in this or a later application.

What is claimed is:

1. An article rack assembly comprising:
   at least two siderails generally parallel to one another and in spaced relation to one another and selectively secured to an outer body surface of a vehicle;
   at least one support assembly member movably disposed along each of said siderails;
   an actuating member disposed in association with said support assembly and selectively rotatable about a pivot point between a locked and an unlocked position;
   a locking pin assembly disposed for movement within said support assembly member and urged between said locked and unlocked position by said actuating member;
   at least one crossbar assembly disposed between said siderails, said crossbar assembly having opposing ends with said support assembly member disposed at each of said opposing ends; and
   at least one rod disposed within said crossbar assembly, said at least one rod fixed to said actuating member for rotation therewith;
   wherein movement of one said actuating member between said locked and said unlocked positions rotates a first portion of said rod and a second portion of said rod, said second portion spaced away from said first portion, said first and second portions of said rod having a same pivot point as said pivot point of said actuating member, wherein a circumferential extent of rotational motion at said first portion of said rod is essentially duplicated at said second portion of said rod, wherein said rotation of said rod causes a generally simultaneous movement at the opposite said support assembly, thereby generally simultaneously disengaging both said locking pin assemblies from their respective said siderails.

2. The article rack assembly as defined by claim 1, wherein said siderails include a channel, each of said locking pin assemblies having a pin with a lock plate adjacent a first end for receipt into a respective channel, movement of only one of said actuating members in a first direction resulting in corresponding movement of each of said lock plates into selective contact with said corresponding siderail to secure said crossbar assembly and movement of said actuating member in a second direction freeing said crossbar assembly for movement along said channel.

3. The article rack assembly as defined in claim 2, wherein said siderails include detents disposed along said channel, said detents sized to receive lock plates, said lock plates selectively engaging said detents when secured to said siderails.

4. The article rack assembly as defined by claim 1, wherein a locking portion of said actuating member includes a cam.

5. The article rack assembly as defined by claim 4, wherein said locking portion of said actuating member includes an arcuate surface and a flat surface.

6. The article rack assembly as defined by claim 1, wherein a biasing member of said locking portion urges said locking pin assembly into locking engagement with said siderail when said actuating member is placed in said locked position.

7. The article rack assembly as defined by claim 6, wherein said biasing member is one of a spring, a mechanical element, and an elastic element.

8. The article rack assembly as defined by claim 1, wherein said crossbar assembly is formed as one of a hollow and a solid with a thru hole.

9. The article rack assembly as defined by claim 1, wherein said crossbar assembly includes a sleeve member disposed at each of said opposing ends.

10. The article rack assembly as defined by claim 1, wherein said rod is rigid and including one of a solid cross-section and a hollow cross-section.

11. The article rack assembly as defined by claim 1, wherein said actuating member is one of a lever and a wheel.

12. The article rack assembly as defined by claim 1, wherein said first portion of said rod is staked to said at least one actuating member.

13. The article rack assembly as defined by claim 1, wherein said first portion of said rod includes a first free end of said rod adjacent said actuating member, and said second portion of said rod includes a second free end of said rod.

14. An article rack assembly comprising:
   at least two siderails generally parallel to one another and in spaced relation to one another and selectively secured to an outer body surface of a vehicle;
   at least one crossbar assembly disposed between said siderails, said crossbar assembly having opposing ends;
   a first support assembly member disposed at a first one of said opposing ends of said crossbar assembly, said first support assembly member movably disposed along a first one of said siderails;
   a first actuating member associated with said first support assembly member and selectively rotatable about a first pivot point between a locked and an unlocked position;

a first locking pin assembly disposed for movement within said first support assembly member and urged between said locked and unlocked position by said first actuating member;

a second support assembly member disposed at a second one of said opposing ends of said crossbar assembly, said second support assembly member movably disposed along a second one of said siderails;

a second actuating member associated with said second support assembly member and selectively rotatable about a second pivot point between a locked and an unlocked position;

a second locking pin assembly disposed for movement within said second support assembly member and urged between said locked and unlocked position by said second actuating member; and a rod disposed within said crossbar assembly, said at least one rod fixed to said first and second actuating members for rotation therewith;

wherein movement of said first actuating member between said locked and said unlocked positions rotates a first portion of said rod and a second portion of said rod, said second portion spaced away from said first portion, said first and second portions of said rod having a same pivot point as said first pivot point of said first actuating member and said second pivot point of said second actuating member, wherein a circumferential extent of rotational motion at said first portion of said rod is essentially duplicated at said second portion, wherein said rotation of said rod causes a generally simultaneous movement of said second actuating member, thereby generally simultaneously disengaging both said locking pin assemblies from their respective said siderails.

15. The article rack assembly as defined by claim 14, wherein said first portion of said rod is staked to said first actuating member, and said second portion of said rod is staked to said second actuating member.

16. The article rack assembly as defined by claim 14, wherein said first portion of said rod includes a first free end of said rod, said first free end of said rod adjacent said first actuating member, and said second portion of said rod includes a second free end of said rod, said second free end adjacent said second actuating member.

\* \* \* \* \*